Figure 1:
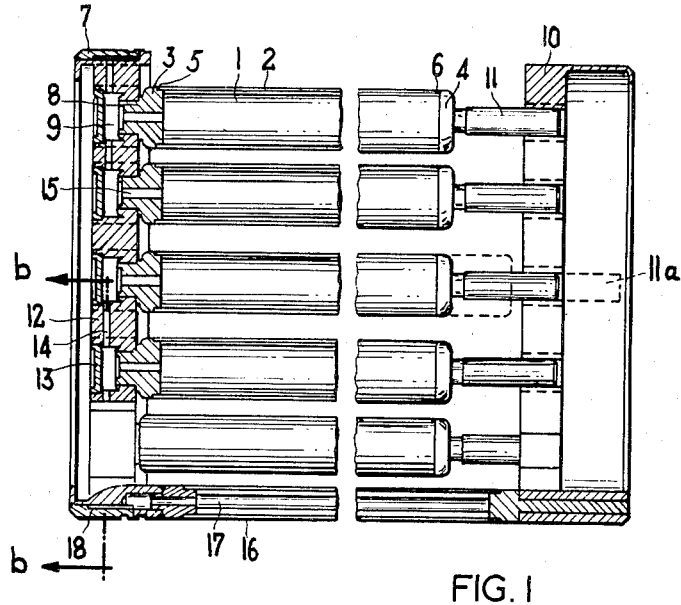

Jan. 25, 1966   P. THOME   3,231,476
NUCLEAR FUEL ELEMENT CLUSTER
Filed Aug. 12, 1963   2 Sheets-Sheet 1

3,231,476
NUCLEAR FUEL ELEMENT CLUSTER
Paul Thome, Saint-Cloud, France, assignor to Commissariat a l'Energie Atomique, Paris, France
Filed Aug. 12, 1963, Ser. No. 301,246
Claims priority, application France, Aug. 16, 1962, 907,009
2 Claims. (Cl. 176—78)

The present invention relates to fuel elements for nuclear reactors cooled by a gas.

In particular, the invention relates to those fuel elements currently known as "cluster elements" in which the sheathed fuel rods, which are called "pencils," are assembled parallel to one another in a cluster and held in this particular geometrical arrangement by structural elements which are also intended to ensure that the elements shall be resistant to a certain number of mechanical and thermal stresses, and also to allow for their movements in the channels of the reactor by attachment of securing arrangements for loading and unloading operations.

More particularly the invention relates to fuel elements in which, so as to limit the stresses they undergo, the pencils are held only at one of their ends, by an attachment grid, the other end being left free to slide in a second grid, the sheaths being as thin as possible for neutronic reasons, and the mechanical efforts being imparted to rigid structural elements which may be a reinforced central pencil containing no fuel, an outer jacket, or tie-rods connecting the two grids.

As is known, during the use of such elements, there is a liberation of fission gases. This liberation depends on the temperature of the fissile element and on its nature. The liberated gases cause an excess pressure inside the pencils and thus limit their working temperature and the admissible combustion rating. Certain solutions have been proposed in which a free space is provided for the expansion of the fission gases at the ends or on the axis of each of the pencils.

It is an object of the present invention to adapt the said fuel elements so that they meet more effectively than hitherto the various requirements made of them in practice, and in particular so that they may offer a larger volume for the expansion of the fission gases, thereby extending the working life of the fuel elements, so that the said expansion volume is at the temperature of the collant gas, and lastly, so that the use of thin sheaths and sheaths out of contact with the enclosed fuel is substantially facilitated.

According to the invention, in addition to interconnecting the free spaces providing in the different pencils and connecting them with the free spaces provided in the structural elements, the free spaces provided in the different pencils are interconnected via minute channels made in the attachment grid, the assembly of the free spaces thus connected to additional free spaces provided in the rigid structural elements connecting the two grids, the non-combustible central pencil, the outer jacket, and the tie-rods.

Figure 2:
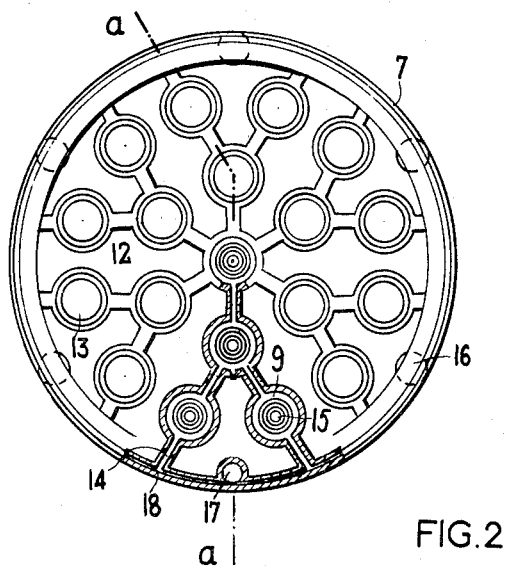
Figure 3:
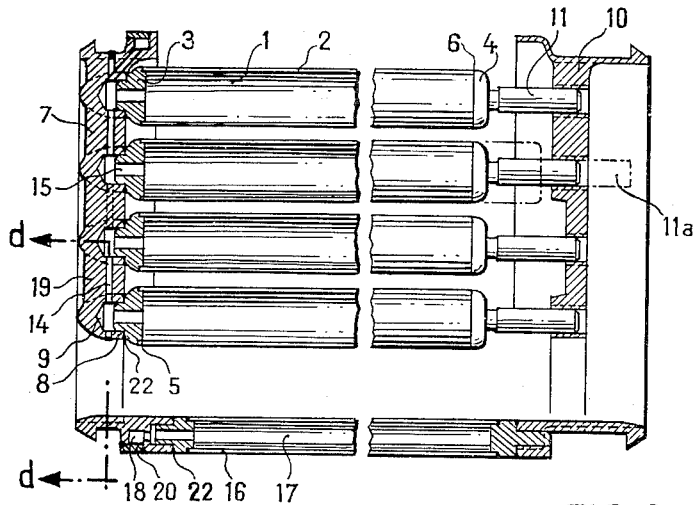
Figure 4:
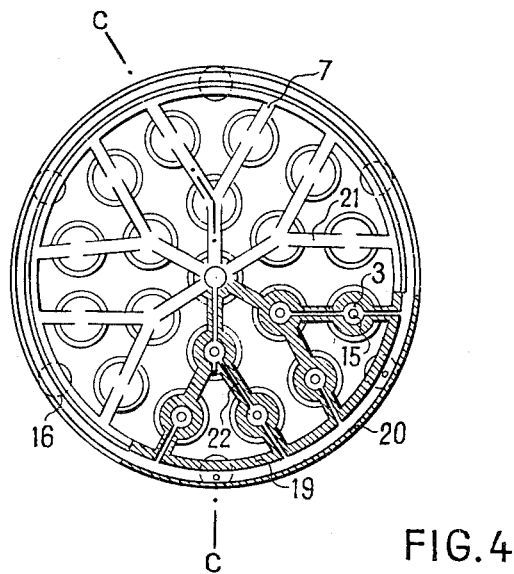

In order that the invention may be more readily understood, reference will now be made to the accompanying drawings, which show two embodiments thereof by way of example, and in which:

FIGURE 1 shows a section of a first embodiment, taken along the line a—a of FIGURE 2, FIGURE 2 shows a left-hand view of the same element, with partial section along the line b—b of FIGURE 1, FIGURE 3 shows a section of a second embodiment taken along the line c—c of FIGURE 4, and FIGURE 4 is a left-hand view of the element of FIGURE 3, with partial section taken along the line d—d of FIGURE 3.

Referring to the drawings, FIGURES 1 and 2 show a first example of a "cluster" fuel element, in accordance with the invention, in which pencils 1, which may advantageously be constituted by a stack of uranium oxide rings, are surrounded by a sheath 2, and closed at their ends by plugs 3 and 4 soldered, welded or brazed onto a sheath at 5 and 6 respectively.

The different pencils such as 1 are held together by two grids: firstly an attachment grid 7 to which they are fixed by brazing teats 8 of the plugs 3 in sockets 9; and secondly a grid 10, in which the extensions 11 of the plugs 4 may slide freely, and which allows for the free expansion of the pencils while continuing to guide them, up to position 11a.

The attachment grid 7 comprises spacer elements 12 and plugs 13. These spacer elements 12 have minute channels 14 passing through them, connecting the different sockets 9 and therefore the free spaces of the pencils 1 via holes 15 made in the plugs 3.

The two grids 7 and 10 are held together by a series of tie-rods 16 forming a squirrel cage. Free intercommunicating spaces 17 communicating with the minute channels 14 via a circula groove 18 provided in the attachment grid 7, are provided in the said tie-rods.

In the first example illustrated, the assembly of the holes 15, the sockets 9, the minute channels 14, the groove 18 and the spaces 17 constitutes a reservoir for the fission gases.

A second embodiment of a fuel element in accordance with the invention, is shown in FIGURES 3 and 4: here, the grid 7 is formed by two parts 19 and 20. The part 19 comprises a series of ribs 21 with minute channels 14 passing through them, putting the socket 9 either in intercommunication or in communication with the circular groove 18. After brazing parts 19 and 20, the tie rods and the pencils are brazed in their turn at 22 onto the grid 7.

It goes without saying, and results, moreover, from the foregoing, that the invention is in no way limited to the embodiments described and illustrated; on the contrary, it covers all variants, and, in particular, cases where the free spaces provided in the tie-rods are replaced or increased by a free space provided in a central non-combustible pencil and/or in an outer jacket, when the said central pencil may even serve as the only tie-rod and be rigidly fixed to the two grids.

I claim:

1. An improved fuel element for gas cooled nuclear reactors of the "cluster" element type, a plurality of sheathed fuel rods including a non-combustible central rod held in a definite geometrical arrangement by structural elements forming a self contained unit, said structural elements comprising two end grids, an outer jacket and tie rods between said grids, free spaces in said central rod and in said tie and fuel rods, minute channels in one of said grids interconnecting said spaces and additional free spaces in said non-combustible central rods, in said outer jacket and in said tie rods connected to said channels.

2. A fuel element as claimed in claim 1, one of said grids being an attachment grid, said attachment grid comprising two parts, one of said parts including said minute channels and said parts being fastened together.

References Cited by the Examiner
UNITED STATES PATENTS
3,010,889 11/1961 Fortescue et al. ----- 176—37 X
3,039,947 6/1962 Fortescue et al. ----- 176—37 X FOREIGN PATENTS
903,489 8/1962 Great Britain.

LEON D. ROSDOL, *Primary Examiner.*
REUBEN EPSTEIN, *Examiner.*
R. L. GRUDZIECKI, *Assistant Examiner.*